United States Patent
Jackson et al.

(10) Patent No.: US 10,661,549 B2
(45) Date of Patent: May 26, 2020

(54) SYSTEMS AND METHODS FOR ADDITIVE MANUFACTURING TO ENCAPSULATE TRANSFORMATIVE COLLOIDAL SUSPENSIONS

(71) Applicants: Julie A. Jackson, Livermore, CA (US); Eric Duoss, Dublin, CA (US); Alexandra Golobic, Oakland, CA (US); Mark Christian Messner, Tracy, CA (US); Christopher Spadaccini, Oakland, CA (US); Kenneth J. Loh, San Diego, CA (US)

(72) Inventors: Julie A. Jackson, Livermore, CA (US); Eric Duoss, Dublin, CA (US); Alexandra Golobic, Oakland, CA (US); Mark Christian Messner, Tracy, CA (US); Christopher Spadaccini, Oakland, CA (US); Kenneth J. Loh, San Diego, CA (US)

(73) Assignees: Lawrence Livermore National Security, LLC, Livermore, CA (US); The Regents of the Univeristy of California, Oakland, CA (US)

( * ) Notice: Subject to any disclaimer, the term of this patent is extended or adjusted under 35 U.S.C. 154(b) by 510 days.

(21) Appl. No.: 15/239,306

(22) Filed: Aug. 17, 2016

(65) Prior Publication Data
US 2018/0050500 A1 Feb. 22, 2018

(51) Int. Cl.
B29C 67/00 (2017.01)
F16F 9/53 (2006.01)
B33Y 10/00 (2015.01)
B29C 64/112 (2017.01)
B29L 9/00 (2006.01)

(52) U.S. Cl.
CPC ............ *B33Y 10/00* (2014.12); *B29C 64/112* (2017.08); *F16F 9/532* (2013.01); *F16F 9/535* (2013.01); *B29K 2995/0008* (2013.01); *B29L 2009/00* (2013.01); *F16F 2226/04* (2013.01)

(58) Field of Classification Search
CPC ........ B33Y 10/00; B29C 64/112; F16F 9/535; B29L 2009/00; B29K 2995/0008
See application file for complete search history.

(56) References Cited

U.S. PATENT DOCUMENTS

2016/0145968 A1\* 5/2016 Marya ................. E21B 33/1208
166/386

OTHER PUBLICATIONS

Deshmukh, S. S., & McKinley, G. H. (2006). Adaptive energy-absorbing materials using field-responsive fluid-impregnated cellular solids. Smart Materials and Structures, 16(1), 106-113. http://doi.org/10.1088/0964-1726/16/1/013.

(Continued)

*Primary Examiner* — Robert J Grun
(74) *Attorney, Agent, or Firm* — Harness, Dickey & Pierce, PLC

(57) ABSTRACT

The present disclosure relates to a method of forming an energy absorbing three dimensional (3D) structure. The method involves forming an outer shell for the 3D structure from a shell material, the outer shell having a void forming a core volume. The method also involves filling the core volume with a transformative liquid. When the 3D structure is fully formed, the transformative liquid is encapsulated within the outer shell and provides enhanced energy absorbing properties to the 3D structure.

22 Claims, 4 Drawing Sheets

(56) References Cited

OTHER PUBLICATIONS

Lorang, D. J., Tanaka, D., Spadaccini, C. M., Rose, K. A., Cherepy, N. J., & Lewis, J. A. (2011). Photocurable Liquid Core-Fugitive Shell Printing of Optical Waveguides. Advanced Materials, 23(43), 5055-5058. http://doi.org/10.1002/adma.201102411.

Leonowicz, M., & Kozlowska, J. (2014). Rheological Fluids as a Potential Component of Textile Products. Fibres Textiles in Eastern Europe, 1(103), 28-33.

Krueger, H., Vaezi, M., & Yang, S. (2014). 3D Printing of Magnetorheological Elastomers (MREs) Smart Materials (pp. 213-218). Presented at the 1st International Conference on Progress in Additive Manufacturing, Singapore: Research Publishing Services. http://doi.org/10.3850/978-981-09-0446-3_088.

* cited by examiner

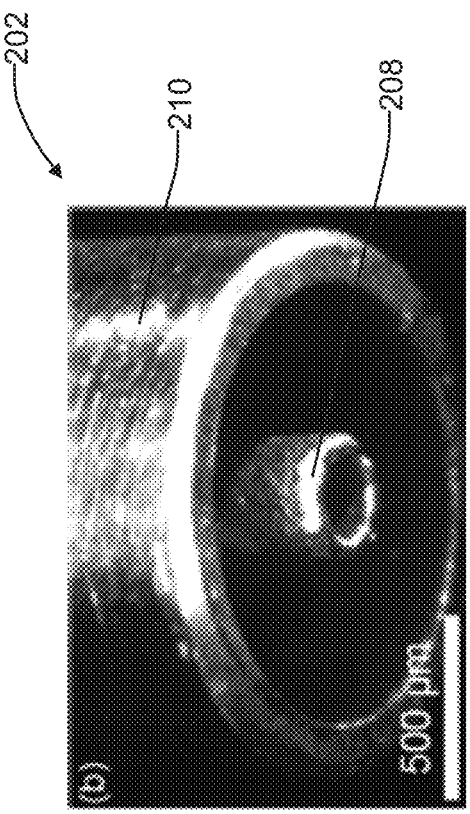
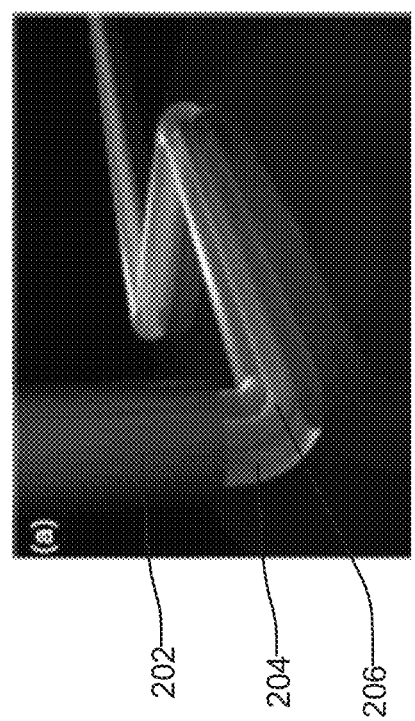
FIGURE 2A
FIGURE 2B

SYSTEMS AND METHODS FOR ADDITIVE MANUFACTURING TO ENCAPSULATE TRANSFORMATIVE COLLOIDAL SUSPENSIONS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and method for additive manufacturing, and more particularly to systems and methods for the construction of integration of transformative suspensions into additively manufactured structures which are expected to find particular utility in energy absorbing, energy dissipation and damping applications, and particularly in wearable energy absorbing systems.

BACKGROUND

This section provides background information related to the present disclosure which is not necessarily prior art.

There is increasing interest in the use of transformative fluids for a wide range of applications. A transformative liquid consists of particles suspended in a liquid medium. When an external force or electromagnetic field comes into contact with the liquid, its mechanical properties change. The use of transformative fluid for energy absorption and dissipation has been employed in the automotive industry for adaptive vehicle suspensions. However, the beneficial properties of transformative fluids have not been fully exploited in other energy absorbing needs because of the lack of means to encapsulate such a fluid in differing geometries, and particularly in three dimensional (3D) geometries. The ability to capture transformative fluids in a wide variety of components having widely differing 3D geometries would open the use of transformative fluids to a wide range of applications heretofore not possible in traditional manufacturing processes.

Specific work in this technology area is disclosed in the following documents: Deshmukh, S. S., & McKinley, G. H. (2006), *Adaptive energy-absorbing materials using field-responsive fluid-impregnated cellular solids. Smart Materials and Structures*, 16(1), 106-113. http://doi.org/10.1088/0964-1726/16/1/013; Lorang, D. J., Tanaka, D., Spadaccini, C. M., Rose, K. A., Cherepy, N. J., & Lewis, J. A. (2011), *Photocurable Liquid Core-Fugitive Shell Printing of Optical Waveguides*, Advanced Materials, 23(43), 5055-5058. http://doi.org/10.1002/adma.201102411; Leonowicz, M., & Kozlowska, J. (2014). Rheological Fluids as a Potential Component of Textile Products. Fibres Textiles in Eastern Europe, 1(103), 28-33; Krueger, H., Vaezi, M., & Yang, S. (2014), 3*D Printing of Magnetorheological Elastomers (MREs) Smart Materials* (pp. 213-218), Presented at the 1st International Conference on Progress in Additive Manufacturing, Singapore, Research Publishing Services. http://doi.org/10.3850/978-981-09-0446-3 088; Deshmukh, et al., *Smart Mater. Struct.* (2006) describes an adaptive energy absorbing material by soaking a sponge with magnetorheological (MR) fluid; Lorang, et al., *Adv. Mater* (2011) describes using a concentric nozzle to additively manufacture two materials simultaneously; Leonowicz, et al., *FTEE* (2014) describes how MR fluid could be integrated into protective textiles by placing bags of the fluid behind Kevlar, and how MR fluid can increase the bullet resistivity of Kevlar when placed behind it; Leonowicz, et al., *FTEE* (2014) describes integrating sheer thickening fluid (STF) into Kevlar by soaking the Kevlar in the STF, and shows that the bullet resistivity of Kevlar increased when soaked with STF, and that sharp objects had a harder time piercing Kevlar when soaked with STF; Krueger, et al., *Pro-AM* (2014) describes the use of a dual head 3D printer to print silicone and a dry powder. All of the foregoing documents are hereby incorporated by reference into the present disclosure.

SUMMARY

This section provides a general summary of the disclosure, and is not a comprehensive disclosure of its full scope or all of its features.

In one aspect the present disclosure relates to a method of forming an energy absorbing three dimensional (3D) structure. The method may comprise forming an outer shell for the 3D structure from a shell material, the outer shell having a void forming a core volume. The method may also involve filling the core volume with a transformative liquid. When the 3D structure is fully formed, the transformative liquid is encapsulated within the outer shell and provides enhanced energy absorbing properties to the 3D structure.

In another aspect the present disclosure relates to a method of forming an energy absorbing three dimensional (3D) structure using an additive manufacturing process. The method may comprise forming an outer shell for the 3D structure from a shell material in a series of successively formed layers, the outer shell having a void forming a core volume. The method also involves filling the core volume with a transformative liquid. When the 3D structure is fully formed, the transformative liquid is encapsulated within the outer shell and provides enhanced energy absorbing properties to the 3D structure.

In still another aspect the present disclosure relates to an energy absorbing three dimensional (3D) structure. The structure may comprise an outer shell formed from a shell material. The outer shell has a void forming a core volume. A transformative liquid is contained in the void. The transformative liquid is encapsulated within the outer shell and provides enhanced energy absorbing properties to the 3D structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is an illustration of two materials being printed simultaneously using a dual flow nozzle assembly, such that a transformative fluid is captured within an internal core volume of the resulting component, and the transformative fluid is enclosed within an outer shell of the resulting component;

FIG. 2B is a perspective view of a bottom portion of the dual flow nozzle;

Figure 3:
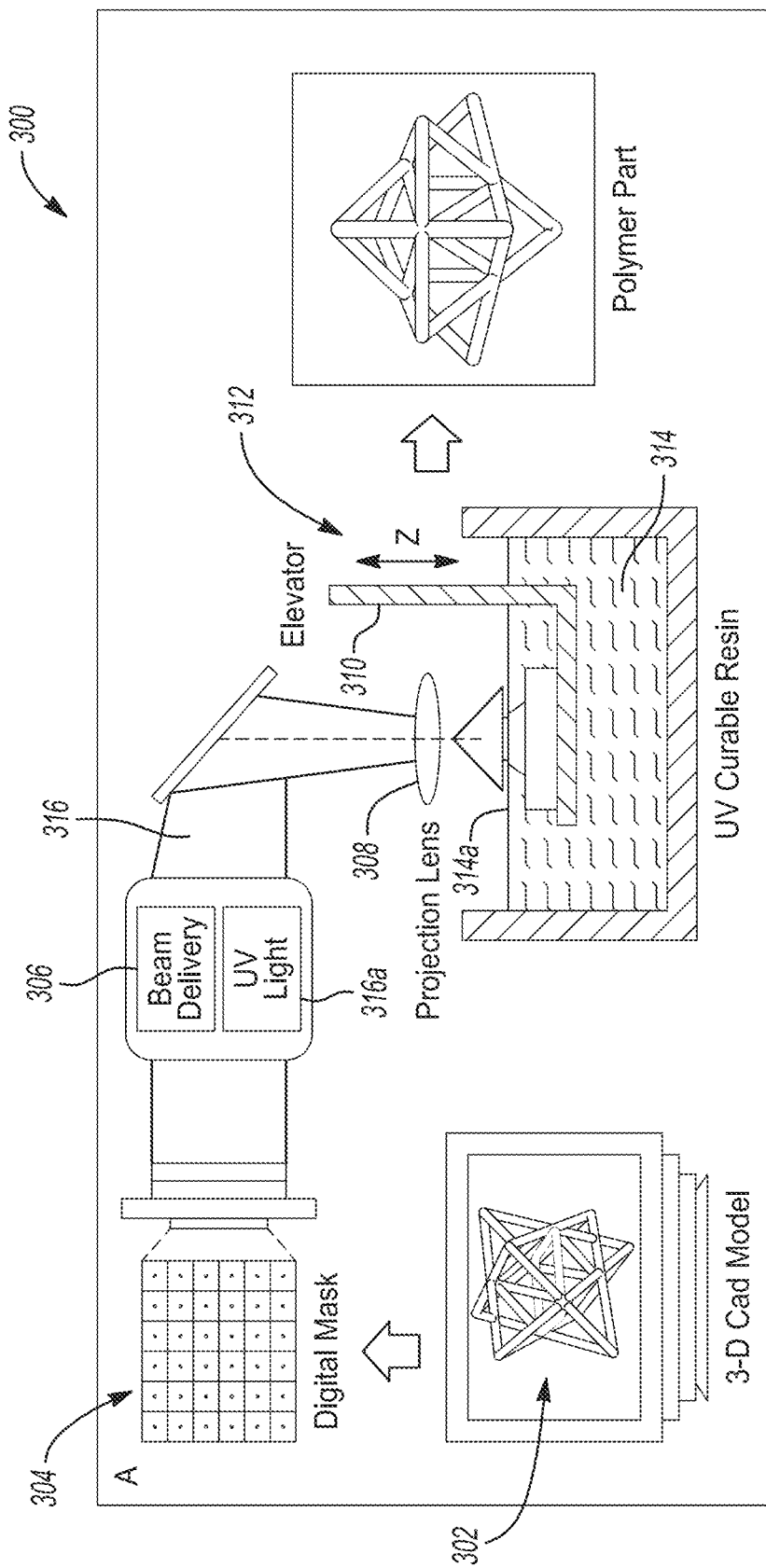
Figure 4:
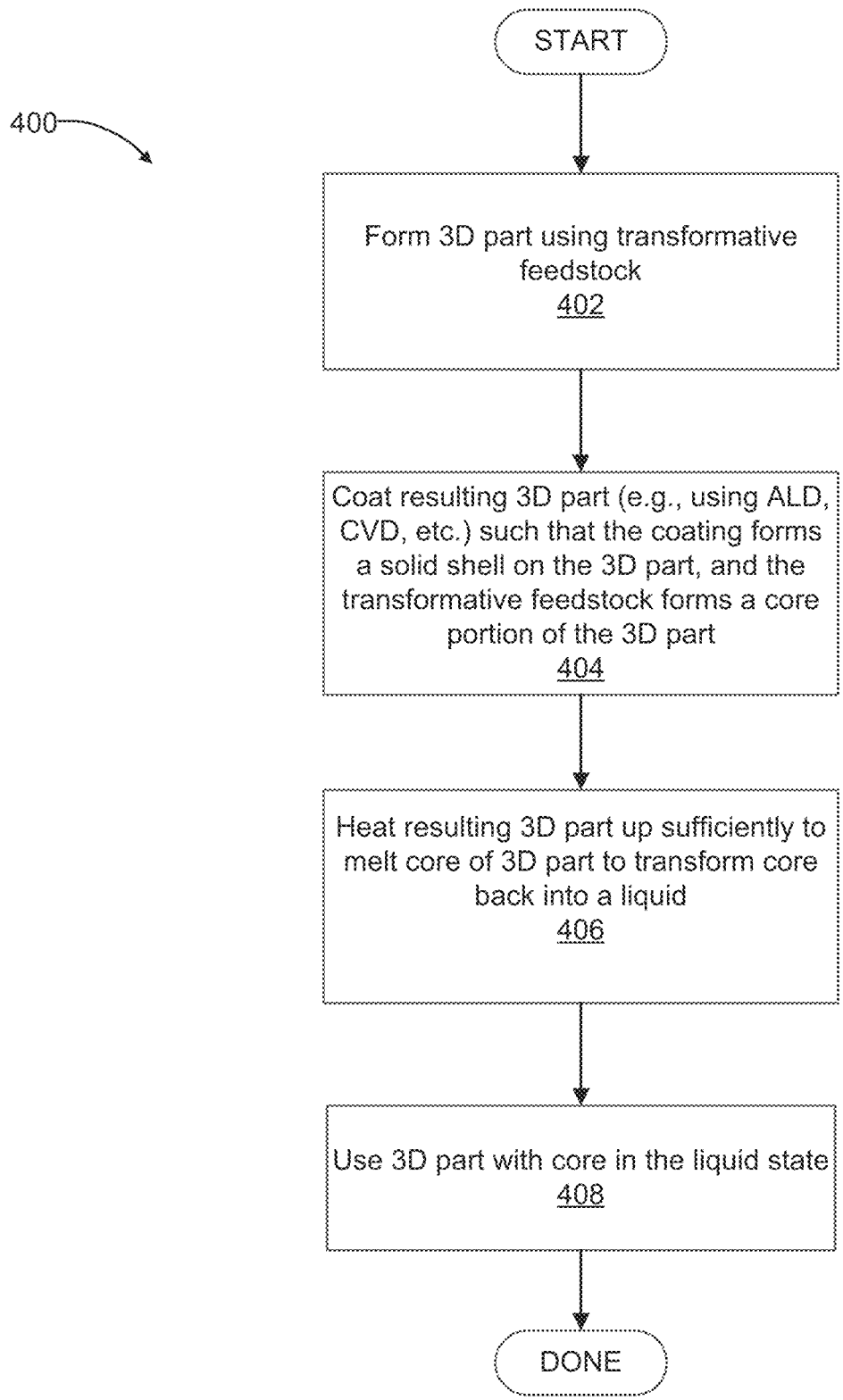

FIG. 3 is a diagram illustrating operations of a projection microstereolithography process for creating a polymer 3D part or structure having an outer shell with a core which is filled with a transformative liquid; and FIG. 4 is flowchart illustrating a plurality of operations that may be performed to construct a 3D structure having a transformative core material, which forms a core portion of the 3D structure, which is coated with a coating that forms a solid shell for the 3D structure, and where the core is capable of being transformed back into a liquid upon the application of sufficient heat to the 3D structure.

Corresponding reference numerals indicate corresponding parts throughout the several views of the drawings.

DETAILED DESCRIPTION

Example embodiments will now be described more fully with reference to the accompanying drawings.

The present disclosure relates broadly to using additive manufacturing and other processes to encapsulate a transformative liquid into a structure, part or component having a three dimensional (3D) geometry. In this regard, it will be appreciated that the term "transformative liquid" encompasses any form of flowable transformative fluid or composition that consists of particles suspended in a liquid or fluid-like medium, and whose mechanical properties change under the presence of a specific condition (e.g., a force or field acting on the liquid or fluid-like medium). This enables the transformative liquid to be patterned into numerous 3D geometries which is expected to further enhance the liquid's mechanical response or enable the transformative liquid to be utilized for applications requiring lightweight or flexible, adaptive energy absorption systems and/or components of such systems. The present disclosure describes four different techniques for integrating a transformative liquid into a structure having a 3D geometry.

Figure 1:
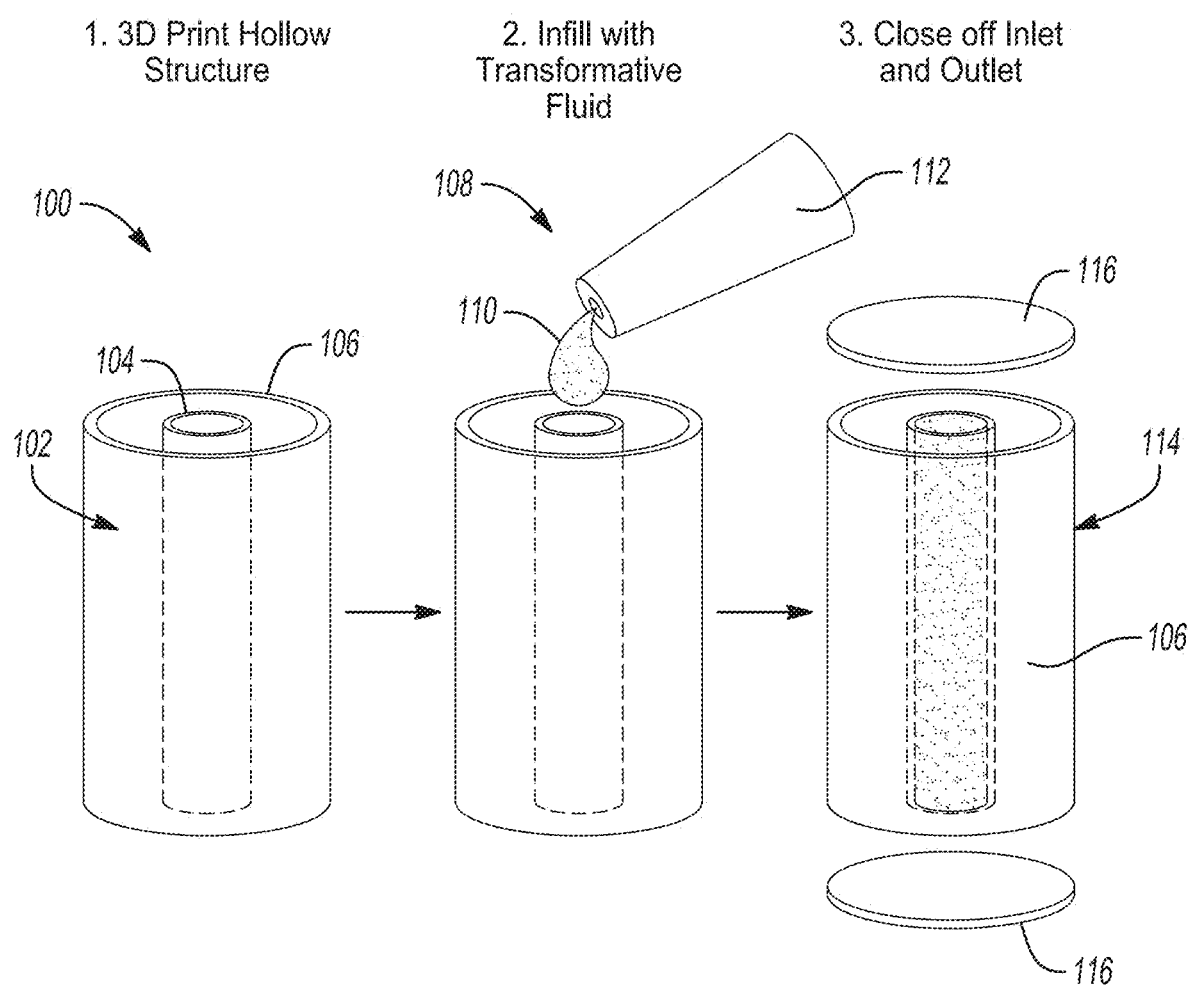
FIG. 1 is a high level drawing of a plurality of operations that may be performed to produce a 3D printed, at least partially hollow structure that includes a transformative fluid within an internal void.

Referring to FIG. 1, a first process 100 is shown for creating a 3D printed structure having a transformative liquid core. Initially a 3D structure 102 is created using a selected feedstock in a conventional additive manufacturing process. The feedstock may be selected from powdered metals, powdered plastics, silicones, acrylates or epoxies, just to name a few suitable materials commonly used in additive manufacturing processes. The structure 102 essentially forms what may be viewed as an outer shell. The structure 102 includes a void 104 that defines a volume within the structure. In this example, the void 104 takes the shape of a cylindrical void which is surrounded by a first material portion 106 making up the structure 102 (i.e., the outer shell of the 3D printed structure). The void 104 may range in diameter anywhere from microns to centimeters to suit the needs of a specific application, and may range significantly in volume as well.

The first material portion 106 consists of the selected feedstock. The void 104 may be open at one or both ends. At least one opening should be maintained to allow air to escape when a subsequent operation of filling the void 104 with a transformative liquid is performed. The opening may be positioned at any location that permits filling the void 104 without leakage, but in many instances it is expected that the opening will most conveniently located near an upper end of the void where it can be easily closed off after the filling operation is completed. And while the structure 102 and the void 104 are shown as having cylindrical shapes, this is merely one example of the shape that the structure 102 may take, and the process 100 is not limited to forming components or structures having any particular shape or geometry. The only requirement is that the structure 102 be capable of being manufactured with an internal void which can contain a transformative liquid.

At operation 108 the structure 102, which is now a solid formed component, has its void 104 filled with a transformative liquid 110 using a desired infill process. The infill process may involve an automated process or a mechanical injection process (e.g., using a syringe). The infill process may also involve a wicking process, a vacuum process, or any other suitable means for filling the void 104. In FIG. 1 an injection process is illustrated using a suitably shaped and dimensioned nozzle 112. At operation 114 further additive manufacturing operations may be used to form one or a pair of cover portions 116 to completely close the void 104. Once the void 104 is closed, the transformative fluid 110 is permanently contained within the structure 102 and forms a core portion of the structure. The transformative liquid 110 used may be a shear thickening fluid, a shear thinning fluid, a magnetorheological fluid, a ferrofluid or any other fluid-like adaptive material. Referring to FIG. 2A a process of using an in-situ infilling technique to form a 3D structure with an internal transformative fluid during an additive manufacturing process. FIG. 2A shows a nozzle 202 of an additive manufacturing system which simultaneously, or substantially simultaneously, deposits two materials to form a 3D structure having an outer layer 204 and a core 206. The core 206 may be a transformative fluid. Depending on the geometry of the structure being formed, the depositing of core 206 material and the outer layer 204 material may be performed simultaneously, or it may be required to build up several layers of outer layer 204 material before applying a quantity of core material. In the latter instance this would create somewhat of an alternating application of outer layer 204 and core 206 materials. In either event the core 206 material is completely encapsulated within the outer layer 204. As with the 3D structure formed by the method 100, the outer layer 204 essentially forms an outer shell for the 3D structure. In this example the core 206 material comprises a transformative liquid. The outer layer 204 may be comprised of any suitable material that forms an impermeable layer or shell, for example plastics, metals, silicones, acrylates or epoxies, just to name a few suitable materials.

FIG. 2B shows a portion of the nozzle 202 used in the method of FIG. 2A. A first nozzle portion 208 is deposited coaxially, and in this example concentrically, with an outer nozzle portion 210. However, the first or inner nozzle portion 208 need not be disposed perfectly concentrically within the outer nozzle portion 210 but instead could be disposed in an eccentric orientation. Still further, more than one first or inner nozzle portion 208 could be included so that two or more different types of transformative fluids could be applied simultaneously, or substantially simultaneously, with the material being deposited by the outer nozzle portion 210. Still further, more than two outer nozzles, arranged coaxially relative to each other, could be used to apply two different types of shell material, or to possibly create two or more distinct voids or pockets within the formed shell structure, which could each be filled with the same or different types of transformative fluids from two or more inner nozzle portions 208. This would enable the finished structure to be provided with different energy absorbing characteristics at different locations of the structure or even at different depths of the structure in a designated volume.

Referring now to FIG. 3, a method 300 is shown in accordance with another aspect of the present disclosure is shown in which a 3D printed structure is produced by using a photocurable, transformative fluid as a feedstock. This method involves using a 3D printing process, for example microstereolithography or stereolithography, to infill a part with a transformative fluid core during the printing process. First a computer is used to analyze a 3D CAD model of a hollow or partially hollow structure and to "slice" the 3D CAD model into a plurality of 2D images, as indicated at operation 302. A digital mask is used at operation 304 to project an image to a beam delivery subsystem at operation 306. The beam delivery subsystem focuses the image using a projection lens 308 onto a build elevator 310 at operation 312. Each one of the 2D images is projected onto the build elevator 310 slightly under the upper surface 314a of a photocurable liquid bath 314, using a UV light source 316a, as indicated at operation 316. The photocurable transformative liquid within the photocurable liquid bath 314 turns to a solid where the image is projected and cured by UV light creating the image (e.g., those areas of the image that are not masked out by the digital mask at operation 304). Once a given layer of transformative fluid builds and is cured (i.e., formed), it is submerged further into the photocurable liquid bath 314. This infills any cavities of the cured (i.e., solid) layer of photocurable transformative liquid, with an uncured quantity of the photocurable transformative liquid. Each layer prints and is infilled in this layer-by-layer process. The finished structure is a solid 3D shell with a transformative fluid core. Again, it is also possible for a portion of the 3D structure to be formed using a first type of photocurable, transformative feedstock, while one or more additional portions of the same 3D structure are formed after changing the transformative feedstock to a different type of transformative feedstock. This could involve placing the elevator adjacent to a different bath or emptying the feedstock material from the bath and replacing it with a different photocurable, transformative feedstock before continuing with the printing process to construct a 3D structure (i.e., part or component) having one or more internal voids that contain a transformative fluid.

Referring to FIG. 4, another method 400 in accordance with the present disclosure is illustrated for creating a 3D structure having a temperature sensitive transformative liquid core. With the method 400, a solid 3D part is initially formed entirely by using a transformative liquid feedstock, as indicated at operation 402. This would refer to any transformative fluid that could be frozen from a liquid to solid or semi solid or melted from a solid or semi solid to a liquid including magnetorheological fluids, ferrofluids, shear thickening fluid, shear thinning fluids or any other transformative fluid that can be frozen or solid/semi-solid that can be melted to behave like a transformative fluid. At operation 404 the solid 3D part is then coated. The coating operation may be performed using an atomic layer deposition ("ALD") process, a chemical vapor deposition ("CVD") process, an electroless plating process, an electroplating process, or possibly even by a painting, spraying or dipping process, or even possibly by a combination of two or more of the above described processes. The coating forms a solid shell on the 3D part that fully encapsulates the transformative material of the 3D part. The coating material may be comprised of plastics, silicones, epoxies, metals, ceramics, latex or any other material that could be used in a coating process. At operation 406 the fully coated 3D part is then heated sufficiently to melt the transformative core material to turn it back into liquid form. The coating, which essentially has formed an impermeable shell for the 3D part, maintains the overall geometry of the 3D part, but with the transformative liquid core material now back in a liquid state, the 3D part may exhibit significantly enhanced energy absorbing qualities. Thus, it will be appreciated that with this method, the 3D part will need to be heated to transform the core material back into the liquid state, and thus to provide the 3D part with energy absorbing qualities. At operation 408 the 3D part is used with the transformative core material in its liquid state.

The method 400 described above provides the advantage that the coated 3D part will have two distinctly different states: one where little or no energy absorbing quality is present, and a second one (after being heated) where a significant energy absorbing quality is present. This may be important in applications where the energy absorbing quality of the 3D part is only required, or desired, under certain conditions. Still further, it is possible to construct a 3D part with more than two transformative materials, each having different energy absorbing characteristics, and each being responsive to different levels of heating, which are encapsulated within the outer coating (i.e., outer shell) layer. Such a configuration could provide areas in the 3D part of different energy absorbing characteristics in response to different levels of heating.

The methods described herein can be used to make 3D components, parts and structures having arbitrary and widely differing 3D geometries. The 3D parts and structures made using the teachings described herein lend themselves well to a wide variety of potential applications. Such applications may include wearable technology such as body armor, helmets and gloves. Additionally, the various embodiments could be placed into various components that humans come into contact with to damp undesirable vibration or to cushion impacts to hands and legs of individuals. Such components may be steering wheel covers, seat cushions, tool handles for motor or pneumatically driven tools that produce vibration, grips for handguns and rifles, shoes, floor mats of motor vehicles, exercise and gymnastic mats, treadmill mats used on treadmills, and various interior surfaces of aircraft and watercraft where vibration and/or impacts may be experienced by occupants.

Further applications of the 3D products manufactured in accordance with the methods described herein may include wearable protective sports equipment such as shin pads, knee pads, elbow pads, shoulder pads, hip pads, thigh pads, neck protectors, torso (i.e., rib) protective vests, etc. The various 3D structures capable of being produced by the methods described herein can form lightweight, yet flexible and highly energy absorbing structures and wearable devices. The ability to produce highly arbitrary and complex 3D structures through an additive manufacturing or like process further enables lightweight 3D structures to be formed which can provide an improved degree of breathability while still providing excellent impact and energy absorbing characteristics, making such structures ideally suited for physically demanding wear in work activities and sports activities.

The methods described herein also may potentially enable existing protective garments (e.g., body armor such as bulletproof vests) to be made lighter and less bulky, without sacrificing impact and energy absorbing protection to the wearer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of forming an energy absorbing three dimensional (3D) structure, comprising:
    forming a first portion of an outer shell for the 3D structure from a shell material, the outer shell having a void forming a core volume;
    filling the void of the core volume with a transformative liquid such that the transformative liquid is contained solely within the void; and
    forming a second portion of the outer shell such that the outer shell forms a 3D structure when fully formed, and the transformative liquid is encapsulated within the void of the outer shell and provides a distinct structure which is independent of the outer shell but contained within the outer shell, to provide enhanced energy absorbing properties to the 3D structure while maintaining the 3D structure as a non-homogeneous structure.

2. The method of claim 1, wherein the first portion of the outer shell is formed first and provided with an opening into which to inject the transformative liquid.

3. The method of claim 2, wherein the first portion of the outer shell is formed layer-by-layer in an additive manufacturing process.

4. The method of claim 1, wherein after the core volume is filled with the transformative liquid, the core volume is closed off so that the transformative liquid is fully contained within the outer shell of the 3D structure.

5. The method of claim 1, wherein the first portion of the outer shell is formed at least substantially simultaneously with filling of the core volume with the transformative liquid, in a layer-by-layer additive manufacturing process.

6. The method of claim 5, further comprising the use of a nozzle for at least substantially simultaneously dispensing both the shell material and the transformative liquid in the layer-by-layer additive manufacturing process.

7. The method of claim 1, wherein the transformative liquid comprises a photocurable transformative liquid feedstock.

8. The method of claim 7, wherein the first portion of the outer shell is formed using a layer-by-layer process to optically cure only specific portions of each layer of the photocurable transformative liquid feedstock, while allowing other portions of each said layer to remain uncured.

9. The method of claim 8, wherein the first portion of the outer shell is formed in a layer-by-layer approach by projecting a series of images onto a quantity of the photocurable transformative liquid, each said image corresponding to one of the layers of the 3D structure; and
    wherein portions of each one of the series of images is masked off to prevent photo curing of the photocurable transformative liquid within each one of the series of images, such that the void is collectively formed, and filled, by uncured portions of the photocurable transformative liquid of each said layer of the 3D structure.

10. The method of claim 9, wherein each said layer is formed by lowering each said layer of the 3D structure, after a curing phase that cures each said layer, further into a reservoir containing the photocurable transformative liquid.

11. The method of claim 1, wherein the filling of the core volume with a transformative liquid comprises filling the core volume with a magnetorheological fluid.

12. The method of claim 1, wherein the filling of the core volume with a transformative liquid comprises filling the core volume with a shear thickening fluid.

13. A method of forming an energy absorbing three dimensional (3D) structure using an additive manufacturing process, the method comprising:
forming an outer shell for the 3D structure from a shell material in a series of successively formed layers, the outer shell having a void forming a core volume;
filling the core volume with a transformative liquid; and
wherein when the 3D structure is fully formed, the transformative liquid is encapsulated within the outer shell and provides enhanced energy absorbing properties to the 3D structure.

14. The method of claim 13, wherein the outer shell and the core having the transformative liquid are formed layer-by-layer, at least substantially simultaneously.

15. The method of claim 13, wherein the outer shell and the core having the transformative liquid are formed using a nozzle which applies a core material for forming the outer shell, and the transformative liquid, at least substantially simultaneously.

16. The method of claim 13, wherein the outer shell is fully formed first, and subsequently the transformative liquid is applied to fill the void.

17. The method of claim 16, further comprising closing off the void using an additional quantity of the shell material to fully encapsulate the transformative liquid within the void.

18. A method of forming an energy absorbing three dimensional (3D) structure using an additive manufacturing process, the method comprising:
forming an outer shell from a photocurable transformative liquid in a layer-by-layer approach to create a 3D structure in a series of successively formed layers, and such that the outer shell has an internal void forming a core volume, each one of said layers being formed by lowering each said layer of the 3D structure, after a curing phase that cures each said layer, further into a reservoir containing the photocurable transformative liquid;
wherein when the 3D structure is fully formed, a quantity of the photocurable transformative liquid is encapsulated in uncured form within the outer shell and provides enhanced energy absorbing properties to the 3D structure.

19. The method of claim 18, wherein the outer shell is formed in the layer-by-layer approach by projecting a series of images onto a quantity of the transformative liquid, each said image corresponding to one of the layers of the 3D structure.

20. The method of claim 19, wherein portions of each one of the series of images is masked off to prevent photo curing of the photocurable transformative liquid within each one of the series of images, such that the internal void is collectively formed, and filled, by uncured portions of the photocurable transformative liquid of each said layer of the 3D structure.

21. A method of forming an energy absorbing three dimensional (3D) structure, comprising:
forming an outer shell for the 3D structure from a shell material, the outer shell having a void forming a core volume;
filling the core volume with a photocurable transformative liquid feedstock; and
wherein when the 3D structure is fully formed, the photocurable transformative liquid feedstock is encapsulated within the outer shell and provides enhanced energy absorbing properties to the 3D structure.

22. A method of forming an energy absorbing three dimensional (3D) structure, comprising:
forming an outer shell for the 3D structure from a shell material, the outer shell having a void forming a core volume, and the outer shell being formed through a layer-by-layer additive manufacturing process;
filling the core volume with a transformative feedstock; and
wherein when the 3D structure is fully formed, the transformative feedstock is encapsulated within the outer shell and provides enhanced energy absorbing properties to the 3D structure.

* * * * *